(12) United States Patent
Diepold et al.

(10) Patent No.: US 10,942,101 B2
(45) Date of Patent: Mar. 9, 2021

(54) DENSITY MEASURING DEVICE FOR DETERMINING THE DENSITY OF FLUID MEDIA

(71) Applicant: Mettler-Toledo GmbH, Greifensee (CH)

(72) Inventors: Andreas Diepold, Graz (AT); Helmut Edelsbrunner, Graz (AT); Johannes Illenberger, Graz (AT); Helmuth Senn, Graz (AT)

(73) Assignee: Mettler-Toledo GmbH, Greifensee (CH)

( * ) Notice: Subject to any disclaimer, the term of this patent is extended or adjusted under 35 U.S.C. 154(b) by 284 days.

(21) Appl. No.: 16/171,588

(22) Filed: Oct. 26, 2018

(65) Prior Publication Data

US 2019/0137376 A1    May 9, 2019

(30) Foreign Application Priority Data

Nov. 6, 2017 (AT) .................................. A 429/2017

(51) Int. Cl.
    *G01N 9/00*      (2006.01)
    *G01D 11/24*      (2006.01)
    *G01F 1/74*      (2006.01)

(52) U.S. Cl.
    CPC ........... *G01N 9/002* (2013.01); *G01D 11/245* (2013.01); *G01F 1/74* (2013.01); *G01N 2009/006* (2013.01)

(58) Field of Classification Search
    CPC .......................... G01N 9/002; G01N 2009/006
    USPC ....................................................... 73/32 A
    See application file for complete search history.

(56) References Cited

U.S. PATENT DOCUMENTS

| 4,655,075 A | * | 4/1987 | Albert | .................... | G01N 9/002 |
|---|---|---|---|---|---|
| | | | | | 73/32 A |
| 2016/0109347 A1 | | 4/2016 | Rechberger et al. | | |
| 2016/0123861 A1 | | 5/2016 | Scheibelmasser et al. | | |
| 2016/0131565 A1 | * | 5/2016 | Breidler | .................. | G01F 23/00 |
| | | | | | 73/32 A |

FOREIGN PATENT DOCUMENTS

| AT | 12626 U1 | | 9/2012 |
|---|---|---|---|
| AT | 514574 B1 | | 2/2015 |
| CN | 201707277 U | | 1/2011 |
| JP | 6-094592 | * | 4/1994 |

* cited by examiner

*Primary Examiner* — Daniel S Larkin
(74) *Attorney, Agent, or Firm* — Standley Law Group LLP; Jeffrey S. Standley; Stephen L. Grant

(57) ABSTRACT

A density measuring device has a hollow body (1) for receiving a fluid medium. The hollow body includes at least two parallel tube sections (6, 6a, 7, 7a) with a connecting line (9) on a first end thereof that connects the tube sections in a U shape. On a second end, the hollow body has a clamping element (2) with a clamping tube (5, 5a) terminating each of the tube sections. An excitation device including a piezoelectric element (4) oscillates the tube sections and a sensor device, also with a piezoelectric element (4a), detects a variable characterizing an excited vibration. Both piezoelectric elements are attached to a contact area (3, 3a) of the clamping element. The contact areas are disposed on the proximal end of the clamping element relative to the tube sections. Each contact area extends across both clamping tubes.

14 Claims, 4 Drawing Sheets

DENSITY MEASURING DEVICE FOR DETERMINING THE DENSITY OF FLUID MEDIA

CROSS-REFERENCE TO RELATED APPLICATIONS

This application claims priority to Austrian Patent Application A 429/2017, filed on 6 Nov. 2017, which is incorporated by reference as if fully recited herein.

TECHNICAL FIELD

The invention relates to a density measuring device for determining the density of fluid media having a hollow body designed as a flexural resonator for receiving the fluid medium to be examined.

BACKGROUND OF THE ART

Density measurement of fluid media using a flexural resonator is based on the fact that the natural oscillations of a tube filled with the fluid medium change with the density of the medium. Measurement of parameters which characterize the oscillating system, such as amplitude and/or attenuation, quality, loss angle, and/or harmonics, particularly natural period or frequency of oscillation after excitation by suitable frequencies, and determination of the response of the oscillating system can be used, inter alia, to determine the density.

EP 3015847 A1, which has also been published as US 2016/0123861, discloses a method and a measuring device for density measurement of fluid media. A flexural resonator with mass balance, particularly a so-called folded or double-bend oscillator, is used as a density sensor. Magnet systems and piezoelectric elements which are disposed in the bending sections of tubes of the folded oscillator running parallel to each other can be used as excitation devices and sensor devices, wherein said bending sections are located on the distal ends of the tubes with respect to the end terminals of the tubes. The flexural resonator with mass balance and measuring and sensing electronics associated with it are preferably fully enclosed in a housing or cartridge. The cartridge is removably or replaceably connected to the measuring device for density measurement.

AT 12 626 U1 describes a density measuring device for determining the density of fluid media, which comprises as a flexural oscillator a hollow body which includes two parallel tube sections and a U-shaped tube. Furthermore, an excitation device and a sensor device are provided, which include, for example, a piezoelectric element or a magnet system with a coil. The excitation device and sensor device can for example be attached outside to the parallel tube sections which form the U-shaped tube. The excitation device for exciting oscillation can preferably be arranged parallel to the plane formed by the longitudinal axes of the tube sections. Oscillations are excited parallel to the plane formed by the longitudinal axes or in that plane, respectively. The tube sections are clamped on one end and designed as X-type oscillators, which means that they oscillate in opposite directions in the plane mentioned. At least the period of oscillation of one of the tube sections is detected for density determination.

The designs according to the state of the art have the disadvantage that the excitation device and the sensor device of the density measuring device—particularly when using magnet systems—can adversely influence the oscillating system with respect to sensitivity and response time due to their mass and thermal capacity. This is particularly true when the excitation device and the sensor device are directly attached to the oscillating tubes. Furthermore, there can be problems with signal cross-talk and excitation of undesirable oscillation modes, which can adversely affect the density measurement.

The objective of the invention is to provide a density measuring device which is easy to manufacture and has improved sensitivity and an improved thermal time constant compared to the prior art. Furthermore, the density measuring device should be minimally affected by external oscillations.

SUMMARY

These objectives are solved by a density measuring device according to the independent claim. The dependent claims relate to further advantageous embodiments of the density measuring device for determining the density of fluid media.

A density measuring device for determining the density of fluid media comprises a hollow body for receiving the fluid medium to be examined. The hollow body includes at least two parallel tube sections as well as a connecting line on a first end of the at least two parallel tube sections, which connects the at least two parallel tube sections in a U shape. On a second end of the at least two parallel tube sections, the hollow body is equipped with a clamping element comprising at least two clamping tubes, into which clamping tubes the at least two parallel tube sections terminate.

An excitation device including a piezoelectric element for exciting an oscillation of the tube sections and a sensor device including a piezoelectric element for detecting a variable characterizing an excited vibration are present in the density measuring device, wherein the piezoelectric element of the excitation device and the piezoelectric element of the sensor device each are attached to a contact area of the clamping element, each in a plane which is parallel to the planes spanned by the longitudinal axes of the at least two tube sections. The contact areas of the clamping element are disposed on the proximal end of the clamping element relative to the at least two tube sections. Each contact area extends across both clamping tubes, and each of the piezoelectric elements likewise extends across both clamping tubes in the direction of its longest side.

The clamping element is understood to be that area of the hollow body which is used to clamp the same into a holder. The hollow body is preferably designed in one piece and preferably made of glass.

As the dimensionally longest side of the piezoelectric elements extends almost across the entire width of a respective contact area, which means that they are each in contact with the two clamping tubes, the at least two tube sections of the hollow body are excited to oscillate at the same time and at about the same amplitude, and accordingly the signals of the oscillating hollow body are detected equally via two tube sections, which, compared to the one-sided excitation and detection of the oscillation signal on one respective tube section, as disclosed in prior art, results in a higher amplitude of the excitation signals and the sensor signals, and thus in higher sensitivity of the density measuring device for determining the density of fluid media. Furthermore, the arrangement of the piezoelectric elements results in improved symmetry of the oscillating system.

The piezoelectric element of the excitation device and the piezoelectric element of the sensor device are disposed on a less sensitive part of the hollow body, namely the clamping element. This reduces their influence on the oscillations of the hollow body, which means that the tube sections can largely oscillate freely. In addition, the risk of breaking glass is reduced due to a lower mass on the oscillating parts of the hollow body.

Furthermore, the piezoelectric elements, due to their low mass compared to a magnet-based excitation device and/or sensor device, reduce the influence on the oscillations of the hollow body. From a mechanical point of view, this lower mass causes increased sensitivity of the sensor. From a thermal point of view, this lower mass causes thermal compensation in reduced time.

Both the fastening location of the piezoelectric elements, that is, on the clamping element, and the comparatively low mass of the piezoelectric elements result in a shortened thermal time constant of the oscillating system. Shortening of the thermal time constant and thus of the heat-up time of the density measuring device is further improved in that magnetic coils used to heat the hollow body are not required any more.

The simplified design makes such a density measuring device more lightweight and cheaper to produce.

In an embodiment, the contact areas of the clamping element are designed as flattened sections of the circumferential surfaces of the respective clamping tubes, which sections are aligned in parallel.

In another embodiment, the clamping tubes of the clamping element are fused on their distal ends with respect to the at least two tube sections and separated by a gap on their proximal ends with respect to the at least two tube sections. The extension of the contact areas of the clamping element parallel to the central longitudinal axis of the clamping tubes at most corresponds to the length of the gap. This results in increased stability of the area of oscillation excitation.

The density measuring device is preferably characterized in that the clamping tubes include two glass tubes tapering conically and reducing their wall thickness and outer diameter towards the tube sections, which glass tubes are fused with the tube sections on their proximal ends.

The inner diameter of the clamping tubes is equal to the inner diameter of the tube sections, and the transition area comprises a smooth and flawless inner surface due to the fusion of the clamping tubes, which preferably consist of glass, with the tube sections, which also preferably consist of glass. This produces a one-piece hollow body. Particularly, the wall thickness of the clamping tubes is at least six times the wall thickness of the tube sections, which ensures another increase in stability of the area which is used for oscillation excitation.

In another embodiment of the density measuring device, the distal end of the clamping tubes of the clamping element, with respect to the at least two tube sections, comprises ports for the supply and discharge of fluid media.

In another embodiment of the density measuring device, the hollow body is designed as a folded oscillator with four parallel tube sections, wherein each two tube sections connected by the U-shaped connecting line are disposed in a plane parallel to the plane spanned by the central longitudinal axes of the clamping tubes and the central longitudinal axes of the two other tube sections and connected to them by bending points, wherein the U-shaped connecting line faces the proximal end of the clamping element.

The design of the hollow body as a so-called folded oscillator with four parallel tube sections has the advantage that an oscillation structure for the fluid medium to be examined is created in a relatively small space. A folded oscillator therefore is a U-tube bent back into itself at the bending points. It is important in this context that the tube sections always run parallel to each other and that the central longitudinal axes of two respective tube sections of the U-tube span two parallel planes. The oscillations go into opposite directions in the planes spanned by the central longitudinal axes.

The U-shaped connecting line on the first end of the at least two parallel tube sections can be stiffened by a stabilizing element, particularly a cross-type stiffener.

In a specific embodiment of the density measuring device, a holder can grip the clamping element near its distal end, which holder is connected to a circuit board, which is equipped with the electronics for exciting the piezoelectric element of the excitation device and the electronics for receiving the signal which is detected by the piezoelectric element of the sensor device.

The symmetry characteristics of the density measuring device are particularly increased in that the excitation device and the sensor device include piezoelectric elements of a similar type, particularly elements made of piezoelectric ceramics.

For electric contacting, the piezoelectric element of the excitation device and the piezoelectric element of the sensor device comprise electrodes in the form of a structured metallic coating of the respective piezoelectric element. Advantageously, a first electric supply line with a first electrode of a piezoelectric element is attached to the surface of the piezoelectric element facing away from the contact area of the clamping element, and a second supply line with a second electrode of a piezoelectric element is also attached to the surface of the piezoelectric element facing away from the contact area of the clamping element, wherein the second electrode is electrically conductively connected to a metallic coating on the surface of the piezoelectric element facing the contact area by peripheral contacting via the end face of the piezoelectric element. Electric contact of the piezoelectric elements can be made by means of soldering or by means of a conductive adhesive or by means of a spring contact.

BRIEF DESCRIPTION OF THE DRAWINGS

The invention is explained below with reference to the highly schematic drawings, wherein.

DETAILED DESCRIPTION OF THE PREFERRED EMBODIMENTS

The density measuring device is shown in the figures as a so-called folded oscillator. A folded oscillator is a U-tube bent back into itself at the bending points. It is important in this context that the tube sections always run parallel to each other and that the central longitudinal axes of two respective tube sections of the U-tube span two parallel planes.

The oscillatory movements of the tube sections or the two U-tube legs, respectively, regardless of whether they form a simple U-tube oscillator or if they are folded back into themselves forming a folded oscillator, are in opposite directions in the plane(s) spanned by the central longitudinal axes of the two U-tube legs. The result is that no counterweight is required, since the inertia forces cancel each other out in the oscillatory movement.

Figure 1:
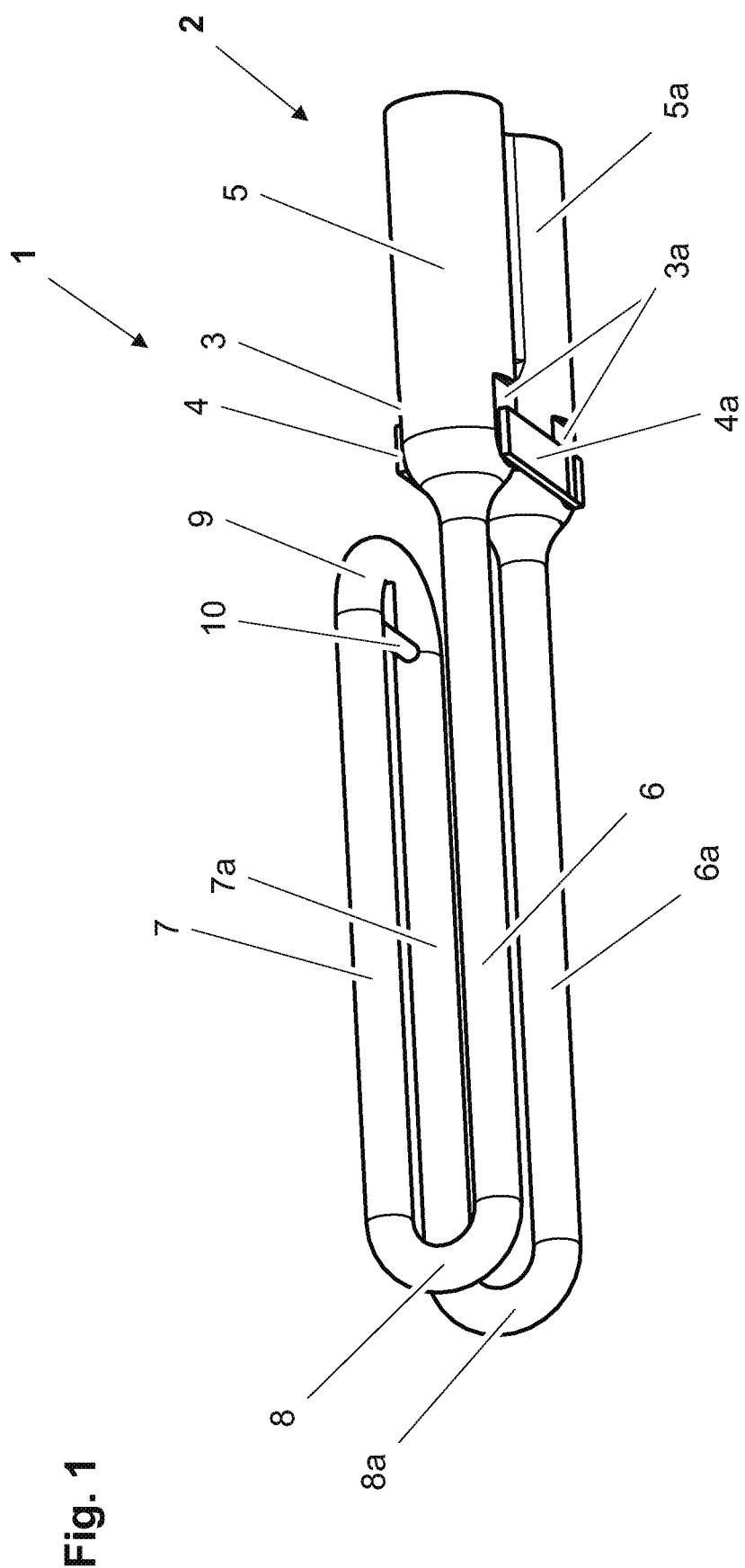
FIG. 1 shows a perspective view of the density measuring device for determining the density of fluid media.

FIG. 1 shows a perspective view of the hollow body 1 of the density measuring device for determining the density of fluid media. The fluid medium is in the hollow body 1 for determining the density. A clamping element 2 of the hollow body 1 is used to clamp the hollow body 1 into a holder and includes two clamping tubes (5, 5a) aligned parallel to each other.

Further shown at the top and bottom in FIG. 1 are contact areas 3, 3a disposed opposite each other on the clamping element 2, wherein the contact areas 3, 3a represent flattened sections on the round metal surfaces of the clamping element 2. The contact areas 3, 3a each extend across the two clamping tubes 5, 5a. A piezoelectric element 4, 4a is fastened, preferably glued, to each one of the opposing contact areas 3, 3a, respectively. The piezoelectric elements 4, 4a extend across almost the entire width of a respective contact area 3, 3a, that is, they each are in contact with the two clamping tubes 5, 5a. The piezoelectric elements 4, 4 are components of an excitation device and a sensor device, which excites oscillations in the hollow body 1 and captures the oscillations of the hollow body 1. The functions of exciting and capturing oscillations are preset by the wirings of the excitation device and the sensor device, however each of the piezoelectric elements 4, 4a can be charged with the one and the other function. It is preferred, but not absolutely required, that the piezoelectric elements 4, 4a are of the same design. A preferred material for the piezoelectric elements 4, 4a is a piezoceramic made by PI-Ceramic, Germany, known under the trade name PIC255.

The clamping tubes 5, 5a of the clamping element 2 taper near the contact areas 3, 3a and transition into two parallel tube sections 6, 6a. The clamping tubes 5, 5a are fused on their distal ends with respect to the two tube sections 6, 6a and separated by a gap on their proximal ends with respect to the at least two tube sections 6, 6a (see FIG. 3). The tapering of the clamping tubes 5, 5a is achieved by a reduction of their wall thickness, which means that the wall thickness of the clamping tubes 5, 5a is at least by a factor of six greater than the wall thickness of the tube sections 6, 6a. The inner diameter of the clamping tubes 5, 5a is equal to the inner diameter of the tube sections 6, 6a, and the transition area comprises a smooth and flawless inner surface due to the fusion of the clamping tubes 5, 5a, which preferably consist of glass, with the tube sections 6, 6a, which also preferably consist of glass. The length of the gap at least corresponds to the extension of the contact areas 3, 3a in the direction along the central longitudinal axis of the tube sections 6, 6a (see FIG. 3).

The two parallel tube sections 6, 6a are bent to a U-shape on their ends facing away from the clamping element 2—in FIG. 1, upwards—and continue as tube sections 7, 7a, also aligned parallel to each other and to the tube sections 6, 6a, in a plane parallel to—in FIG. 1, above—the plane spanned by the central longitudinal axes of the tube sections 6, 6a. These bending points 8, 8a are located in a plane perpendicular to the planes spanned by the tube sections 6, 6a and 7, 7a. The two tube sections 7, 7a are connected on their ends facing the clamping element 2 by a U-shaped connecting line 9 located in a plane of the tube sections 7, 7a facing the proximal end of the clamping element 2, such that a continuous hollow space of the hollow body 1 for receiving the fluid medium is formed, starting at the clamping tubes 5, 5a via the tube sections 6, 6a, the bending points 8, 8a, and the tube sections 7, 7a and the U-shaped connecting line 9 which connects them.

The hollow body 1 thus forms a so-called folded oscillator having four parallel tube sections 6, 6a, 7, 7a. This arrangement has the advantage that an oscillating structure for the fluid medium to be examined is created in a relatively small space. The oscillations go into opposite directions along the central longitudinal axes of the planes spanned by the tube sections 6, 6a and the tube sections 7, 7a.

A stabilizing element 10 inside the arc of the U-shaped connecting line 9 is used for reinforcement. This stabilizing element 10 is advantageous, but not absolutely required.

Figure 2:
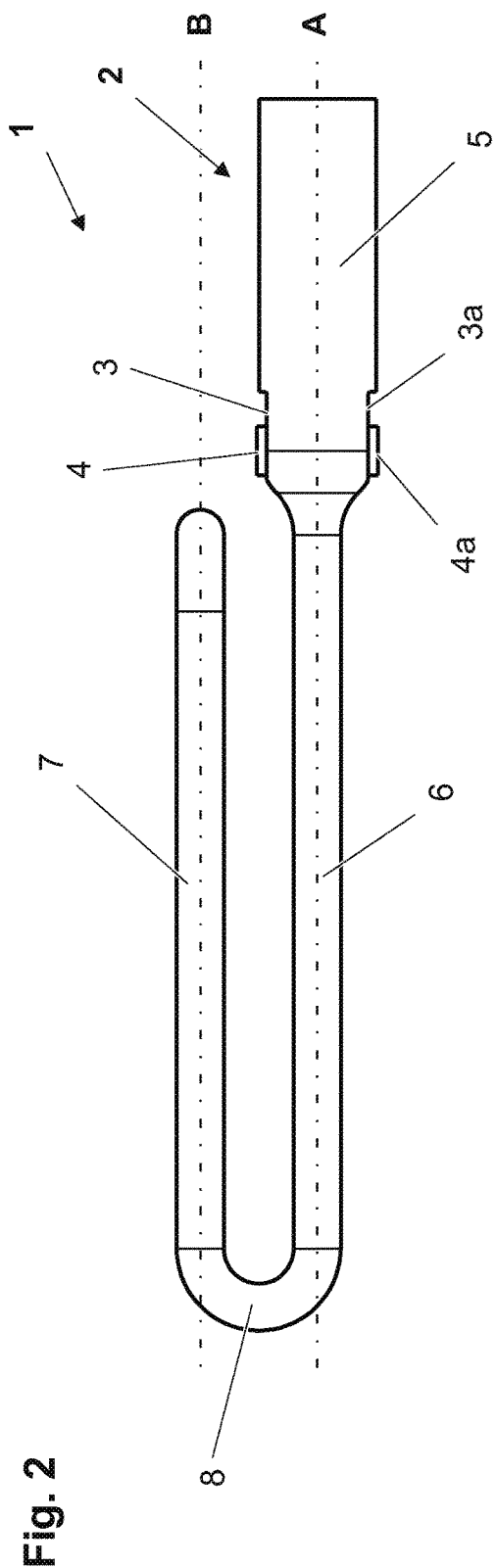
FIG. 2 shows a side view of the density measuring device of FIG. 1.
Figure 3:
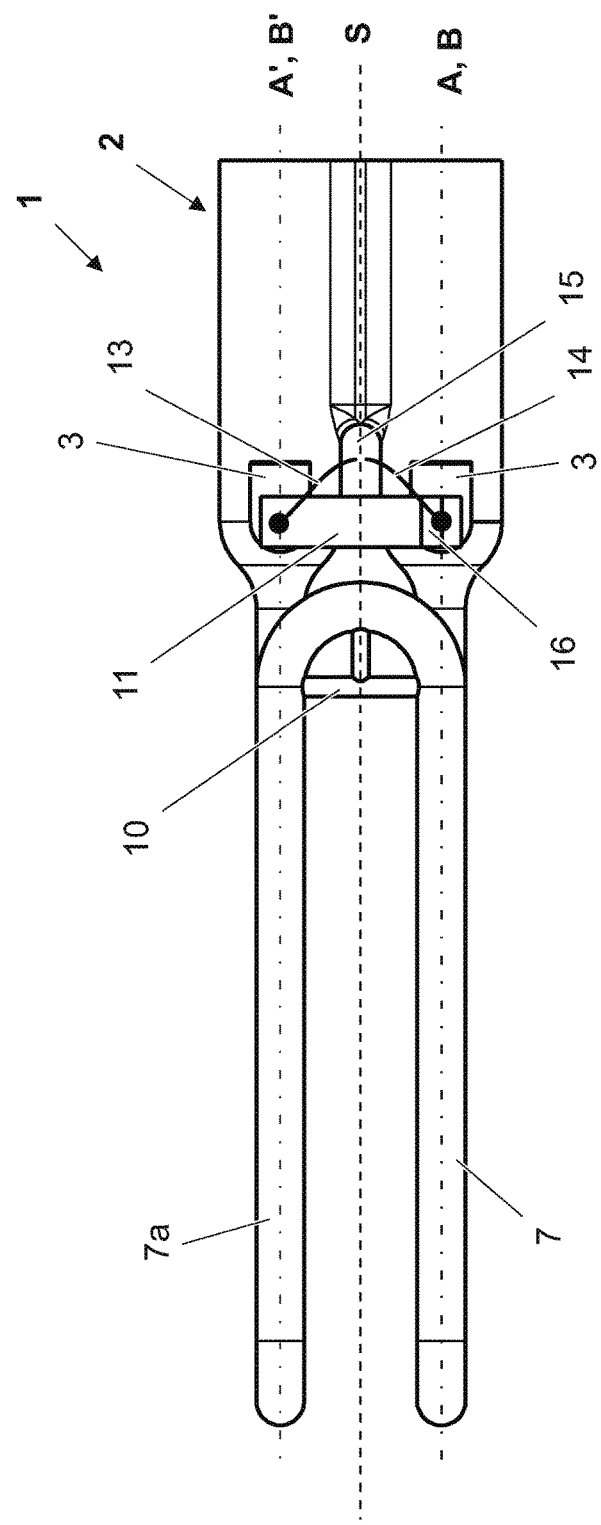
FIG. 3 shows a plan view of the density measuring device of FIG. 1.

FIG. 2 shows a side view of the hollow body 1 of the density measuring device of FIG. 1, FIG. 3 shows a plan view thereof. The central longitudinal axes of the tube sections 6 and 7 are labelled A and B in FIG. 2. These axes, together with the respective central longitudinal axes of the tube sections 6a, 7a, which are not visible in FIG. 2, span two planes aligned parallel to each other, in which the tube sections 6, 6a, 7, 7a of the folded oscillator extend. The clamping tubes 5, 5a of the clamping element 2 also extend in the plane defined by the central longitudinal axes A, A', as shown in FIG. 3. This means that the central longitudinal axes A, A' of the tube sections 6, 6a also form the central longitudinal axes of the clamping tubes 5, 5a.

The circumferential surfaces of the respective clamping tubes 5, 5a are flattened near their proximal ends with respect to the tube sections and form the flat contact areas 3, 3a, which extend parallel to the plane formed by the central longitudinal axes A, A'. The piezoelectric elements 4, 4a are fastened, preferably glued, to these contact areas 3, 3a, one of which being visible at the top and one at the bottom of the clamping element 2 in FIG. 2. The adhesive used is an adhesive known for fastening strain gages. In their two-dimensional extension, the piezoelectric elements 4, 4a are also disposed in a plane parallel to the plane spanned by the central longitudinal axes A, A'.

FIG. 3 shows the hollow body 1 in a plan view. The piezoelectric element 4 attached to the contact area 3 comprises on its side facing away from the contact area 3 in FIG. 3, facing the viewer two electrodes 11, 12 (the latter feature shown in FIG. 4) to which electrical supply lines 13, 14 for wiring the piezoelectric element 4 are attached. The electrodes 11, 12 are a structured metallic coating of the piezoelectric element 4, wherein the electrode 11 represents a partial coating of the surface of the piezoelectric element 4 facing away from the contact area 3 and the electrode 12 is preferably electrically conductively connected to a preferably full-surface metallic coating of the surface of the piezoelectric element 4 facing the contact area 3. This electrically conductive connection continues in a so-called peripheral contacting via one of the end faces of the piezoelectric element 4 to the contact area 12, which covers a section of the surface of the piezoelectric element 4 facing away from the contact area 3. The three other side surfaces of the piezoelectric element 4 are not coated. Likewise, an insulation area 16 on the surface of the piezoelectric element 4 facing away from the contact area 3 is uncoated and thus isolates the electrode 11 from the electrode 12.

A soldered connection between electrodes 11, 12 and the electric supply lines 13, 14 is preferred. Alternatively, an electrically conductive connection can be made via a spring element or a glued connection using a conductive adhesive.

Figure 4:
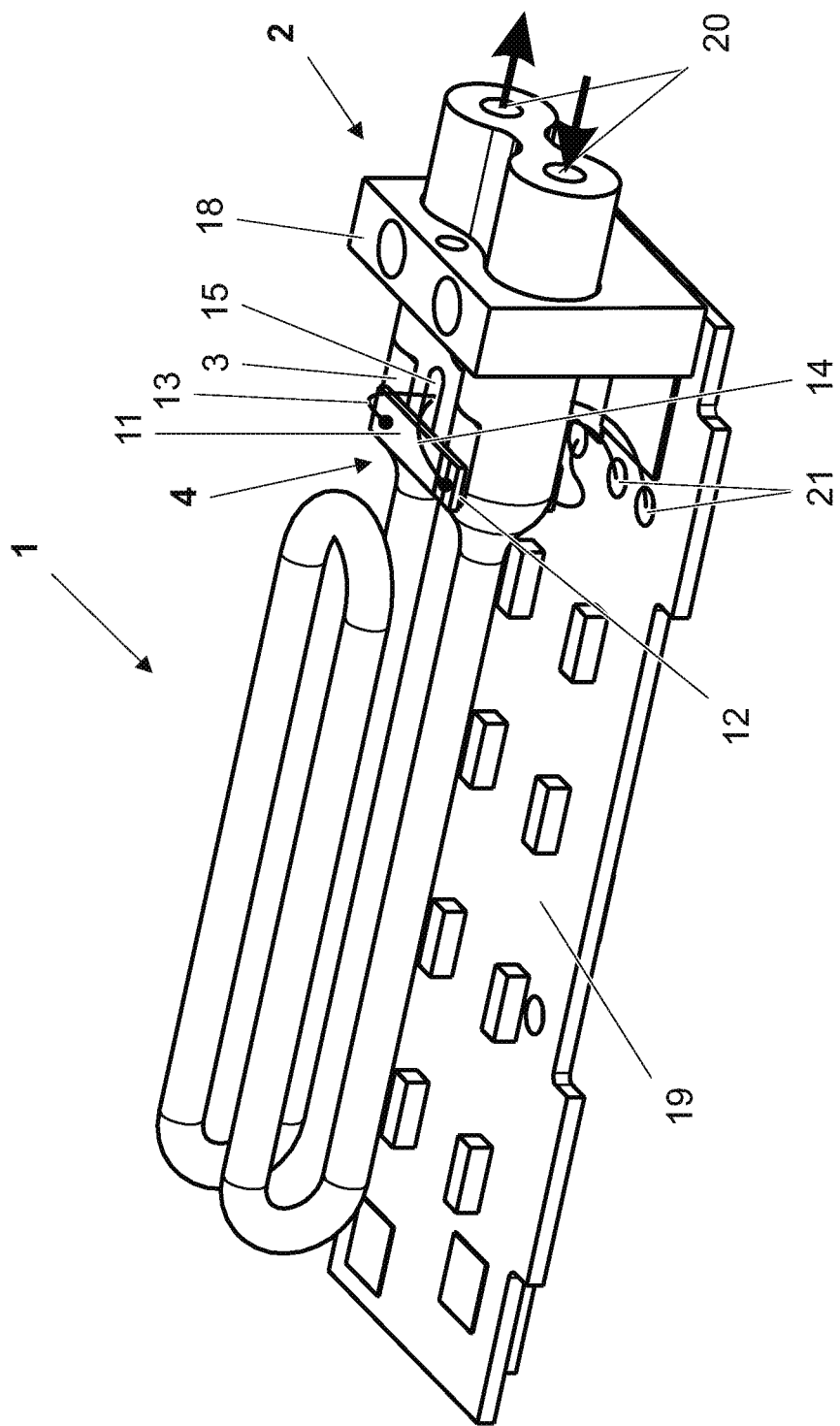
FIG. 4 shows a perspective view of the density measuring device for determining the density of fluid media fastened in a holder and connected to a circuit board via the holder.

The supply lines 13, 14 are conducted through the gap 15 in the clamping element 2 and to a circuit board 19 which functions as a support element (see FIG. 4).

The stabilizing element 10 is a T-shaped structure disposed inside the arc of the U-shaped connecting line in FIG. 3.

As can be derived from FIGS. 1 to 3, the hollow body 1 is designed as an oscillating structure which is symmetrical with respect to a symmetry plane S plotted in FIG. 3. This symmetry plane S extends orthogonally relative to the planes spanned by the axes A, A' of tube sections 6, 6a and the planes spanned by the axes B, B' of the tube sections 7, 7a and centrally relative to the hollow body 1. It is particularly important for faultless operation of the density measuring device for determining the density of fluid media that a high degree of symmetry of the arrangement and parts with respect to the plane S is maintained when producing the hollow body 1 and placing the piezoelectric elements 4, 4a.

The piezoelectric element 4 forming the excitation device is subjected to broadband excitation for determining the density of fluid media. The base frequency, i.e. the lowest resonant frequency of the oscillating structure, which substantially includes the tube sections 6, 6a, 7, 7a and the bending points 8, 8a and connecting line 9 connecting them, is received and a frequency shift caused by filling the oscillating structure with a fluid medium is detected. Either the resonant frequency of the unfilled oscillating structure or that of an oscillating structure filled with a medium of known density—such as water—is used as a reference measurement. The frequency for determining the density of a fluid medium in the density measuring devices for determining the density of fluid media described and illustrated is in the vicinity of 1 kHz.

FIG. 4 shows a perspective view of the hollow body 1 clamped into a holder 18. The holder 18 encompasses the clamping element 2 of the hollow body 1 as a type of yoke and is fastened to a circuit board 19. This circuit board 19 is equipped with electronics for exciting the piezoelectric element of the excitation device and electronics for receiving the signal which is captured by the piezoelectric element of the sensor device. The circuit board 19 can also be equipped with a memory element in which the parameters characterizing the density measuring device for determining the density of fluid media, particularly calibrating data, are stored.

Arrows outline the connections for filling the hollow body with the fluid medium to be examined and for emptying it. Naturally, the "inlet" and "outlet" functions of the two fluid ports 20 of the clamping element 2 can be reversed. Likewise, the density of a fluid medium can be determined in a flow-through mode of the hollow body 1. It is important in this context to prevent air bubbles.

FIG. 4 further shows the electrodes 11, 12 and the electrical connections of the piezoelectric element 4. The electrical supply lines 13, 14 to the piezoelectric element 4 are conducted through the gap 15 of the circuit board 19 and contacted there at contact points 21. FIG. 4 partially reveals that the piezoelectric element 4a is contacted similarly.

Figure 5:
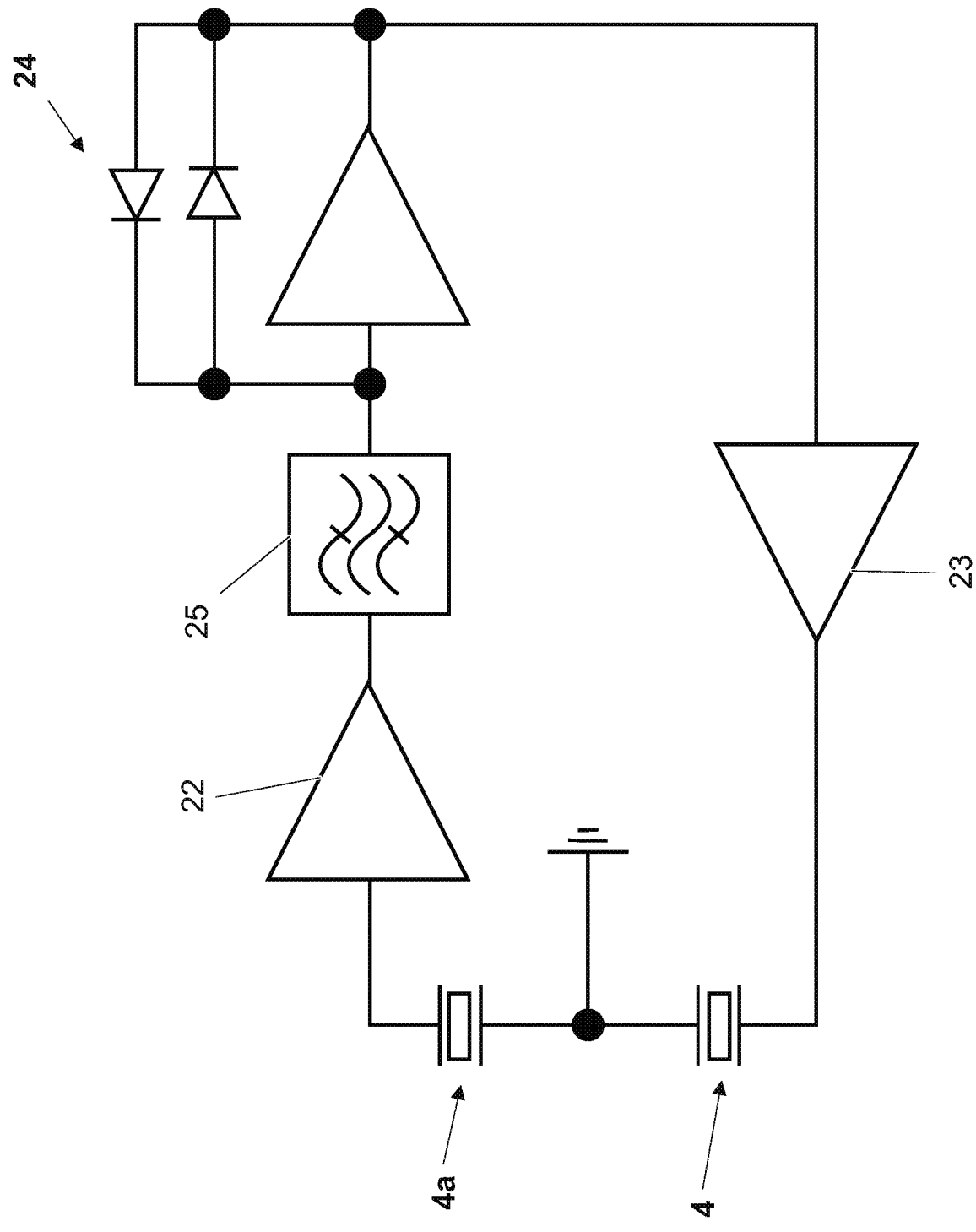
FIG. 5 shows a block diagram of the wiring of the piezoelectric elements.

FIG. 5 shows a wiring diagram of the piezoelectric elements 4, 4a. The electric signal of the excitation device is applied to the input side of an amplifier device. The piezoelectric element 4 is associated with the excitation device and the piezoelectric element 4a is associated with the sensor device herein.

A preamplifier unit 22 amplifies the signal taken from the piezoelectric element 4a. This signal characterizes the shift of the resonant frequency of the oscillating hollow body 1 relative to the resonant frequency of a reference measurement, that is, a measurement with an empty hollow body or a hollow body 1 filled with a fluid medium of known density, which shift is caused by the fluid medium located in the hollow body 1.

A filter device 25 filters out undesirable signal portions. These are such signal portions which do not coincide with the natural oscillation of the hollow body 1 selected for measuring the density of a fluid medium and can for example contain harmonics or cross-talk signals.

A limiter circuit 24 is responsible for a stable signal with sufficient amplification. An output stage 23 adjusts the amplitude to the requirement of the piezoelectric element of the excitation device and creates the required phase condition.

The invention was shown and described with reference to preferred embodiments. Other embodiments and further developments of the invention which are not expressly mentioned herein are intended to be included in the scope of protection as well.

What is claimed is:

1. A device configured for measuring the density of a fluid medium, comprising:
    a hollow body for receiving the fluid medium, comprising:
        at least two parallel tube sections, each having a central longitudinal axis;
        a connecting line, on a first end of the at least two parallel tube sections, connecting the at least two parallel tube sections in a U-shape; and
        a clamping element, on a second end of the at least two parallel tube sections, the clamping element comprising at least two clamping tubes into which the at least two parallel tube sections terminate, the clamping element having a first and a second contact area disposed on a proximal end of the clamping element relative to the at least two tube sections, each contact area extending across both clamping tubes;
    an excitation device, comprising a first piezoelectric element, configured for exciting an oscillation of the at least two parallel tube sections; and
    a sensor device, comprising a second piezoelectric element, configured for detecting a variable characterizing an excited oscillation;
    wherein the first and the second piezoelectric elements are attached, respectively, to the first and second contact areas in a plane that is parallel to the planes spanned by the central longitudinal axes of the at least two tube sections, and each of the piezoelectric elements extends across the at least two clamping tubes in the direction of its longest side.

2. The device of claim 1, wherein the contact areas are configured as flattened sections of a circumferential surfaces of the respective at least two clamping tubes, which are aligned parallel to each other.

3. The device of claim 2, wherein:
    with respect to the at least two tube sections, each of the at least two clamping tubes is fused on a distal end thereof and separated by a gap on a proximal end thereof.

4. The device of claim 3, wherein:
    the contact areas extend parallel to the central longitudinal axis of the at least two clamping tubes no more than the length of the gap.

5. The device of claim 1, further comprising:
    as a part of the at least two clamping tubes, two glass tubes that taper conically, with a wall thickness and outer diameter that reduces towards the tube sections, each of the glass tubes are fused on a proximal end thereof with respect to the tube sections.

6. The device of claim 5, wherein the at least two clamping tubes each have a wall thickness that is at least six times the wall thickness of the at least two tube sections.

7. The device of claim 1, further comprising:
as a part of the at least two clamping tubes, fluid ports to supply and discharge of the fluid medium on the distal ends thereof with respect to the at least two tube sections.

8. The device of claim 1, wherein:
the hollow body is configured as a folded oscillator with four parallel tube sections, such that each of the at least two tube sections connected by the U-shaped connecting line are disposed in a plane parallel to the plane spanned by the central longitudinal axes of the at least two clamping tubes and the central longitudinal axes of the two other tube sections, with the U-shaped connecting line facing the proximal end of the clamping element.

9. The device of claim 1, further comprising:
a stabilizing element, on the first end of the at least two parallel tube sections, stiffens the U-shaped connecting line.

10. The device of claim 9, wherein the stabilizing element is configured as a cross-type stiffener.

11. The device of claim 1, wherein the clamping element is adapted to be gripped by a holder that is connected to a circuit board having electronics configured for exciting the first piezoelectric element and the electronics configured for receiving a signal which is detected by the second piezoelectric element.

12. The device of claim 1, wherein the respective piezoelectric elements are made of piezoelectric ceramics.

13. The device of claim 1, wherein the respective piezoelectric elements each comprise electrodes in the form of a structured metallic coating of the respective piezoelectric element.

14. The device of claim 13, further comprising:
a first electric supply line with a first electrode of a piezoelectric element is attached to the surface of the piezoelectric element facing away from the contact area of the clamping element; and
a second supply line with a second electrode of a piezoelectric element is also attached to the surface of the piezoelectric element facing away from the contact area of the clamping element, the second electrode being electrically conductively connected to a metallic coating on the surface of the piezoelectric element facing the contact area by peripheral contacting via an end face of the piezoelectric element.

* * * * *